United States Patent [19]
Brunelle et al.

[11] Patent Number: 5,264,548
[45] Date of Patent: Nov. 23, 1993

[54] LOW MELTING CYCLIC POLYCARBONATE COMPOSITION

[75] Inventors: Daniel J. Brunelle, Scotia, N.Y.; Thomas G. Shannon, Evansville, Ind.

[73] Assignee: General Electric Company, Schenectady, N.Y.

[21] Appl. No.: 826,570

[22] Filed: Jan. 27, 1992

Related U.S. Application Data

[63] Continuation-in-part of Ser. No. 585,460, Sep. 20, 1990, abandoned.

[51] Int. Cl.$^5$ .............................................. C08G 64/04
[52] U.S. Cl. ..................................... 528/370; 528/86; 528/196; 528/204; 528/371; 528/372
[58] Field of Search ............... 528/370, 196, 204, 371, 528/372, 86

[56] References Cited

U.S. PATENT DOCUMENTS

| | | |
|---|---|---|
| 3,155,683 | 11/1964 | Moody . |
| 3,271,463 | 9/1966 | Jackson . |
| 3,274,214 | 9/1966 | Prochaska . |
| 4,217,438 | 8/1980 | Brunellet et al. . |
| 4,299,948 | 11/1981 | Weirauch et al. . |
| 4,368,315 | 1/1983 | Sikdar . |
| 4,605,731 | 8/1986 | Evans et al. . |
| 4,638,077 | 1/1987 | Brunelle et al. . |
| 4,644,053 | 2/1987 | Brunelle et al. . |
| 4,727,134 | 2/1988 | Brunelle et al. . |

*Primary Examiner*—Harold D. Anderson
*Attorney, Agent, or Firm*—William H. Pittman

[57] ABSTRACT

A cyclic polycarbonate oligomer having a low melting point useful in the preparation of high molecular weight resins. The cyclic polycarbonate oligomers have structural units with long alkyl chains which may contain ester substituents.

9 Claims, No Drawings

LOW MELTING CYCLIC POLYCARBONATE COMPOSITION

This application is a continuation-in-part of copending application Ser. No. 07/585,460 filed on Sep. 20, 1990, now abandoned.

The present invention relates to cyclic polycarbonate oligomers useful in the preparation of high molecular weight resins such as polycarbonates and to articles formed therefrom.

Compositions containing mixtures of cyclic oligomers and their method of preparation are disclosed in U.S. Pat. Nos. 4,727,134 and 4,644,053. Said patents also disclose the preparation of such cyclic polycarbonate oligomer mixtures from bisphenols, but are limited to bisphenols with alkyl chains having up to about 9 carbon atoms. These prior art cyclic polycarbonate oligomer mixtures have relatively low melting points (about 200° C. to about 220° C. for bisphenol A, hereinafter sometimes "BPA", cyclic polycarbonate oligomer mixtures), which makes them useful in processing. The low melting point allows processing before polymerization takes place to produce the more viscous high molecular weight polymer. However, cyclic polycarbonate oligomers having even lower melting points and thus lower processing temperatures would be advantageous. Cyclic polycarbonate oligomers exhibiting melting points of about 100° C. to about 175° C. would have a wide scope of useful applications such as in the formation of wood or wood fiber composite structures to prevent wood charring, and in reaction injection molding processes to facilitate the removal of a part from the mold.

The present invention provides cyclic polycarbonate oligomers exhibiting a melting point from about 100° C. to about 175° C. The polycarbonates are prepared from bisphenols having a bridging radical containing an unsubstituted or substituted alkyl chain with about 14 to about 20 carabon atoms.

In accordance with the present invention, there is provided compositions comprising cyclic polycarbonate oligomers having structural units of the formula

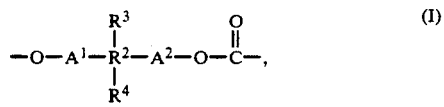

wherein each of $A^1$ and $A^2$ is a monocyclic divalent aromatic radical, $R^2$ is a $C_{1-2}$ hydrocarbon radical, $R^3$ is hydrogen or an alkyl radical having from about 1 to about 5 carbon atoms and $R^4$ is an unsubstituted or substituted straight or branched alkyl radical having at least 10 and more suitably at least 13 carbon atoms.

The cyclic polycarbonate oligomer compositions of the present invention may also have structural units of the formula

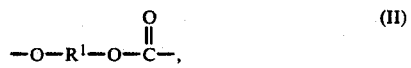

wherein $R^1$ is a divalent aromatic radical preferably having the formula —$A^3$—Y—$A^4$— and each of $A^3$ and $A^4$ is a monocyclic divalent aromatic radical. The bridging radical Y is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical is the 2,2-bis(4-phenylene)propane radical, which is derived from bisphenol A and in which Y is isopropylidene and $A^3$ and $A^4$ are each p-phenylene.

The cyclic polycarbonate oligomer compositions of the present invention may also include structural units of the formula

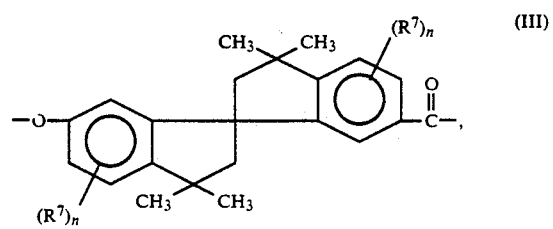

wherein each $R^7$ is independently $C_{1-4}$ primary or secondary alkyl or halo and n is an integer from 0 to 3; and optionally a crosslinking agent.

The cyclic polycarbonate oligomer compositions of the present invention have low melting points, for example, about 150° C. to about 175° C. for the bisphenol based cyclic polycarbonate oligomers, as well as the inherently low viscosity of oligomeric cyclics. Thus, lower processing temperatures are possible with polycarbonate oligomer compositions of the present invention than with those of the prior art and the cyclic polycarbonate oligomer compositions of the present invention can be used in many applications in which lower processing temperatures are desired or required, such as, for example, those applications discussed above.

The structural units of formula I may be considered as being derived from the corresponding bisphenols, which are a known genus of compounds. They may be prepared by the reaction of two moles of phenol with one mole of the corresponding ketone. Suitable bisphenols of this type and the method for their preparation are disclosed, for example, in British Patent 959,286.

In formulas I and II, the $A^{1-4}$ values may be unsubstituted phenyl or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. All of $A^{1-4}$ are preferably p-phenylene, although one member of each of the $A^{1-2}$ and $A^{3-4}$ pairs may be o- or m-phenylene and the other p-phenylene.

The structural units of formula I contain bridging radicals between $A^1$ and $A^2$ in which $R^4$ can contain non-hydrocarbon substituents that are substantially inert in the context of this invention such as nitro, alkoxy, aryloxy and carbalkoxy. It is especially preferred in certain instances for $R^4$ to have the formula $R^5COOR^6$, wherein $R^5$ is hydrogen or an alkyl radical of 1 to about 8 carbon atoms and $R^6$ is a straight or branched chain alkyl radical containing about 4–19 carbon atoms. Bisphenols of this structure are exemplified by the esters of diphenolic acid—i.e., 3,3-bis(4-hydroxyphenyl)propionic acid—and may be prepared by conventional esterification reactions.

While the proportion of structural units of formula I in the cyclic polycarbonate oligomers of the present invention is not critical, said oligomers usually contain from about 0.5% to about 40%, preferably from about 1% to about 15% and most preferably about 2% to about 10% of said structural units.

The spirobiindane units of formula III are derived from the 6,6'-dihydroxy-3,3,3',3'-tetramethylspirobiindanes, which may be substituted or unsubstituted. The $R^7$ values therein may be alkyl radicals such as methyl, ethyl, 1-propyl or 2-propyl or halo atoms such as chloro or bromo. Among compounds containing such $R^7$ values, methyl and chloro are preferred; however, the most preferred compound of formula III is 6,6'-dihydroxy-3,3,3',3'-tetramethylspirobiindane in which n is 0. This compound is identified hereinafter as "SBI".

The compositions of the present invention optionally contain a crosslinking agent. Suitable crosslinking agents are disclosed in U.S. Pat. Nos. 4,794,160 and 4,701,537 both of which are incorporated herein by reference. Preferably the crosslinking agents are bicarbonates of resorcinol sulfide, bis(2,4-dihydroxy-3-methylphenyl)methane, 2,2',4,4'-tetrahydroxybiphenyl, 2,2',4,4'-tetrahydroxybenzophenone, bis(2,4-dihydroxyphenyl) sulfide, bis(2,4-dihydroxyphenyl) sulfoxide and bis(2,5-dihydroxyphenyl) sulfone.

The preferred cyclic polycarbonate oligomers of the present invention have degrees of polymerization from 2 to about 30 and more preferably to about 20 and most preferably with a major portion up to about 12.

The cyclic polycarbonate oligomers of the present invention may be prepared by a condensation reaction involving the corresponding bishaloformates, especially bischloroformates. The condensation reaction typically takes place interfacially when a bishaloformate solution in a substantially non-polar organic liquid is contacted with a trialkylamine, preferably triethylamine, and an aqueous alkali metal hydroxide solution. Methods of preparation for cyclic polycarbonate oligomer mixtures are disclosed in U.S. Pat. No. 4,727,134, incorporated herein by reference.

The low melting cyclic polycarbonate oligomers can also contain a low proportion of linear oligomers. In general, no more than about 10% by weight and most often no more than 5% of such linear oligomers are present. The mixtures also may contain low percentages (frequently less than 30% and preferably no higher than about 20%) of polymers (linear or cyclic) having a degree of polymerization greater than about 30. These properties, coupled with the relatively low melting points and viscosities of cyclic polycarbonate mixtures, contribute to their utility as resin precursors, especially for high molecular weight resins.

The cyclic oligomers of this invention are liquid and substantially non-volatile at resin formation temperatures and have low viscosities. Thus, it is possible to integrate resin formation therefrom with such operations as molding. For example, the cyclic polycarbonate oligomers may be simultaneously polymerized and molded upon application of heat to the mold. The molded articles produced thereby constitute another embodiment of the invention.

The cyclic polycarbonate oligomers of the present invention have a melting point near and often below the glass transition temperature of the resultant polymerized high molecular weight product. The compositions of the present invention are useful to enhance mixing during polymerization or crosslinking of compositions with high glass transition temperatures, thus allowing more uniform, smoother and tougher compositions. The oligomers of the present invention having melting points of about 100° C. to 175° C. and their inherent low viscosities are further useful in the formation of wood fiber composite structures which can be processed at temperatures low enough to eliminate charring of the wood, and in reaction injection molding processes to facilitate the removal of a part from the mold.

The cyclic oligomers of this invention are useful as intermediates for conversion to linear polycarbonates. They may be polymerized during extrusion or molding operations, upon raising their temperature to conventional extrusion or molding temperatures. Molding and simultaneous polymerization may be achieved by several known techniques, including injection molding and rotational molding. The cyclic oligomers of this invention are also advantageously combined with inert filler materials to produce prepreg compositions which may be polymerized to thermoplastic composites having excellent impact resistance, moisture resistance and ductility. Such thermoplastic composites have a number of advantages over the somewhat more well known thermoset composites, such as the capability of being shaped after polymerization is completed.

Suitable fillers for the composites of this invention include talc, quartz, wood flour, wood fibers, glass fibers, finely divided carbon and silica. Continuous fiber fillers, including carbon, glass, highly oriented polyamide and boron fibers, are particularly useful. Carbon fibers are frequently preferred, especially when a particularly stiff composite article is desired. The filler may be in unidirectional form, either as yarns or as random fibers, or may be woven into fabric batts or tapes. Such composites including wood fibers may be formed without charring of the wood.

The polycarbonate formation catalysts which can be used in resin formation include various bases and Lewis acids. It is known that basic catalysts may be used to prepare polycarbonates by the interfacial method, as well as be transesterification and from cyclic oligomers. Reference is made to U.S. Pat. Nos. 3,155,683, 3,274,214, 4,217,438 and 4,368,315. Such catalysts may also be used to polymerize the cyclic oligomers. Examples thereof are lithium 2,2,2-trifluoroethoxide, n-butyllithium and tetramethylammonium hydroxide. Also useful are various weakly basic salt such as sodium benzoate and lithium stearate.

A particularly useful class of catalysts is disclosed in U.S. Pat. No. 4,605,731. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl)titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetate. Among the preferred catalysts are lithium stearate and bisisopropoxytitanium bisacetylacetonate.

The resin formation reaction is typically effected by simply contacting the cyclic oligomer mixture with the catalyst at temperatures up to 350° C., preferably about 100° C.-200° C., until polymerization has proceeded to the extent desired. Although the use of a solvent is within the scope of the invention, it is generally not preferred. In general, the amount of catalyst used is about 0.001-1.0 mole percent based on structural units in the oligomer mixture.

The invention is illustrated by the following examples.

EXAMPLES 1-13

Cyclic polycarbonate oligomers were synthesized in the following manner. Two mmol. of the bisphenol from Examples 1-13, respectively and 18 mmol. of bisphenol A (BPA) bischloroformate (6.35 grams) were dissolved in 20 ml. of $CH_2Cl_2$. This solution was added over a 30 minute period to a stirred mixture of 20 ml. of $CH_2Cl_2$, 0.5 gram of $Et_3N$ and 10 ml. of 5N NaOH. After addition was complete the organic layer was separated and washed with 1N HCl and 0.1N NaOH and several times with water. The product solution was dried by filtering through phase separation paper and then rotoevaporated. HPLC analysis was used to show the presence of mixed cyclics. The cyclics were removed from the high polymer by extraction of the cyclics into acetone. The cyclics were dried for at least 8 hours under vacuum before softening and melting points were determined.

Polymerizations were carried out in the following manner: A 0.5-gram portion of cyclics was dissolved in 5 ml. of methylene chloride, 1.2 mg (0.25 mole %) of tetra-n-butylammonium tetraphenylborate was added and the solution was evaporated to dryness. The samples were dried thoroughly at 60° C. and then melt polymerized under $N_2$ at 250° C. for 20 minutes. The polymerized samples were then cooled, dissolved in $CH_2Cl_2$ and precipitated with methanol. The polymers were filtered and dried and the molecular weight (Mw) and glass transition temperature (Tg) of the polymers determined.

The results for copolycarbonates of bisphenol A and 10 mole percent of a bisphenol in which $R^4$ was a long-chain alkyl radical are given in Table I, in comparison with bisphenol A homopolycarbonate as control.

TABLE 1

| Example | $R^3$ | $R^4$ | Mole % | Cyclic mp | Polymer Mw | Polymer Tg |
|---|---|---|---|---|---|---|
| 1 | H | $C_{13}H_{27}$ | 10 | 148° C. | 159,000 | 132° C. |
| 2 | $C_2H_5$ | $C_{15}H_{31}$ | 10 | 100° C. | 157,000 | 115° C. |
| Control | | | 100 | 210° C. | 150,000 | 154° C. |

Table I shows about a 50°-100° C. decrease in the cyclic melting point where bisphenols containing long alkyl chain bridging radicals are incorporated into the mixed cyclic polycarbonate oligomers as compared to the melting point of cyclic BPA homopolycarbonate oligomers.

Table II illustrates the decrease in the cyclic melting point in copolycarbonates of bisphenol A with the specified mole percentage of bisphenols in which $R^3$ was methyl, $R^4$ was $R^5COOR^6$, $R^5$ was ethylene and $R^6$ was as designated.

TABLE II

| Example | $R^6$ | Mole % | mp | Polymer Tg |
|---|---|---|---|---|
| 3 | n-$C_4H_9$ | 10 | 162 | 137 |
| 4 | n-$C_6H_{13}$ | 10 | 146 | 130 |
| 5 | n-$C_8H_{17}$ | 10 | 140 | — |
| 6 | n-$C_{10}H_{21}$ | 10 | 136 | — |
| 7 | n-$C_{12}H_{25}$ | 10 | 128 | — |
| 8 | n-$C_{16}H_{33}$ | 10 | 120 | 115 |
| 9 | n-$C_{18}H_{37}$ | 10 | 120 | 110 |
| 10 | " | 15 | 110 | — |
| 11 | " | 2.5 | 160$^a$ | — |
| 12 | 2-Ethylhexyl | 3 | 160$^b$ | — |
| 13 | " | 1 | 165$^b$ | — |

$^a$Flow apparent in capillary at 200° C.
$^b$Flow apparent at 195° C.

EXAMPLES 14-18

Table III illustrates the reduced cyclic melting point in systems with high glass transition temperatures, such as the polycarbonates of SBI, including crosslinked systems using bicyclic crosslinkers, when the bisphenols with long chain bridging radicals are incorporated into the system to make the cyclic polycarbonate oligomers of the present invention. The melting points in Table III are values to be expected for compositions of this type.

TABLE III

| Example | Composition | Cyclic mp | Polymer Tg |
|---|---|---|---|
| 14 | 100% SBI + 2% low-melt* + 5% X-link** | 180° C. | 192° C. |
| 15 | 100% SBI + 5% X-link** | | 207° C. |
| 16 | 50/50 BPA/SBI | 204° C. | 187° C. |
| 17 | 50/50 BPA/SBI + 2% low-melt | 180° C. | 185° C. |
| 18 | 65/35 BPA/SBI + 2% low-melt + 5% X-link** | 150° C. | 171° C. |

*Low melt is the bisphenol of Example 2.
**Crosslinker is the biscarbonate of resorcinol sulfide.

What is claimed is:

1. A composition comprising cyclic polycarbonate oligomers having structural units of the formula

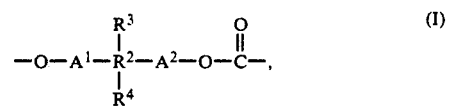

wherein each of $A^1$ and $A^2$ is a monocyclic divalent aromatic radical and $R^2$ is one or two carbon atoms separating $A^1$ from $A^2$, $R^3$ is hydrogen or an alkyl radical having from about 1 to about 5 carbon atoms and $R^4$ is a straight-chain or branched alkyl radical of at least 10 carbon atoms.

2. A composition according to claim 1 wherein $A^1$ and $A^2$ are both p-phenylene.

3. A composition according to claim 2 wherein $R^4$ is a straight-chain alkyl radical.

4. A composition according to claim 1 which also contains structural units of the formula

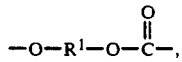

(II)

wherein $R^1$ is a divalent aromatic radical.

5. A molded article comprising the composition of claim 4.

6. A composition according to claim 4 wherein $R^1$ is $-A^3-Y-A^4-$, wherein each of $A^3$ and $A^4$ is a monocyclic divalent aromatic radical and Y is a radical in which one or two atoms separate $A^3$ from $A^4$.

7. A composition according to claim 6 wherein each of $A^3$ and $A^4$ is p-phenylene and Y is isopropylidene.

8. A composition according to claim 4 wherein the cyclic oligomer composition has about 0.5% to about 40% of structural units of formula I.

9. A composition according to claim 8 wherein $R^4$ is a straight-chain alkyl radical.

* * * * *